United States Patent
Bello, Jr.

(10) Patent No.: US 6,481,877 B1
(45) Date of Patent: Nov. 19, 2002

(54) LIGHTED AUTOMOTIVE FLOOR MATS

(76) Inventor: Roberto Bello, Jr., 7851 MacDonald, #6, Huntington Beach, CA (US) 92647

( * ) Notice: Subject to any disclaimer, the term of this patent is extended or adjusted under 35 U.S.C. 154(b) by 0 days.

(21) Appl. No.: 09/656,429

(22) Filed: Sep. 6, 2000

(51) Int. Cl.[7] ................................................. B60Q 3/00
(52) U.S. Cl. ........................ 362/488; 362/545; 362/153
(58) Field of Search ................................. 362/253, 276, 362/488, 487, 486, 802, 800, 153, 545, 183

(56) References Cited

U.S. PATENT DOCUMENTS 4,329,739 A * 5/1982 Loebner ..................... 362/153
4,737,764 A * 4/1988 Harrison .................... 362/153
5,848,830 A * 12/1998 Castle et al. ................ 362/253

* cited by examiner

*Primary Examiner*—Y. My Quach-Lee
(74) *Attorney, Agent, or Firm*—Gene Scott-Patent Law & Venture Group

(57) ABSTRACT

An automotive floor mat is made of a flexible and durable material and of a size and shape for covering a selected area of the floor of a vehicle. A lamp electrical circuit comprises a plurality of lamps wired in spaced apart positions within the fabric of the floor mat. The lamps are positioned to be seen from above the floor mat when the floor mat is in use on the floor of a vehicle. A cigarette lighter plug provides electrical current to the electrical circuit for illumination of the lamps. The lamps may be made to blink at a selected rate via adjustment of a potentiometer circuit. The circuit is embedded between a top mat layer and a bottom mat layer so that the circuit is not damaged when stepped upon.

2 Claims, 2 Drawing Sheets

LIGHTED AUTOMOTIVE FLOOR MATS

BACKGROUND OF THE INVENTION

1. Field of the Invention

This invention relates generally to automotive floor mats and more particularly to such mats where an electrical circuit provides lighting within the floor mats for decoration and for illumination.

2. Description of Related Art

Automotive floor mats are used as standard equipment in automobiles and trucks. Custom mats are available as well providing decorative touches to the interior of these vehicles and providing the benefit of receiving dirt and water that can be easily removed from the vehicle by simply shaking out the floor mats after removal from the vehicle. In this way, the floor of the vehicle is not damaged and added decorative touches are provided and are replaceable when worn. However, the prior art does not teach that vehicle floor mats may be lighted. This is clearly a needed apparatus in that the interior of most vehicles is dimly lit. Such a lighted floor mat device is able to provide a feeling of added security when preparing to enter a dark vehicle in a dark garage and presents endless possibilities for lighted decoration as well. The present invention fulfills these needs and provides further related advantages as described in the following summary.

SUMMARY OF THE INVENTION

The present invention teaches certain benefits in construction and use which give rise to the objectives described below.

An automotive floor mat is made of a flexible and durable material and of a size and shape for covering a selected area of the floor of a vehicle. A lamp electrical circuit comprises a plurality of lamps wired in spaced apart positions within the fabric of the floor mat. The lamps are positioned to be seen from above the floor mat when the floor mat is in use on the floor of a vehicle. A cigarette lighter plug provides electrical current to the electrical circuit for illumination of the lamps. The lamps may be made to blink at a selected rate via adjustment of a potentiometer circuit. Four mats may be wired together and operated in coordinated light sequence.

A primary objective of the present invention is to provide an apparatus and method of use of such apparatus that provides advantages not taught by the prior art.

Another objective is to provide such an invention capable of lighting the interior of a vehicle.

A further objective is to provide such an invention capable of decorative lighting effects in the interior of a vehicle.

A still further objective is to provide such an invention capable of drawing low current at low voltage and still further being walked upon without damage.

A final objective is to provide such an invention that fulfills these objectives in a manner that is competitive or exceeds the capabilities of the prior art.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
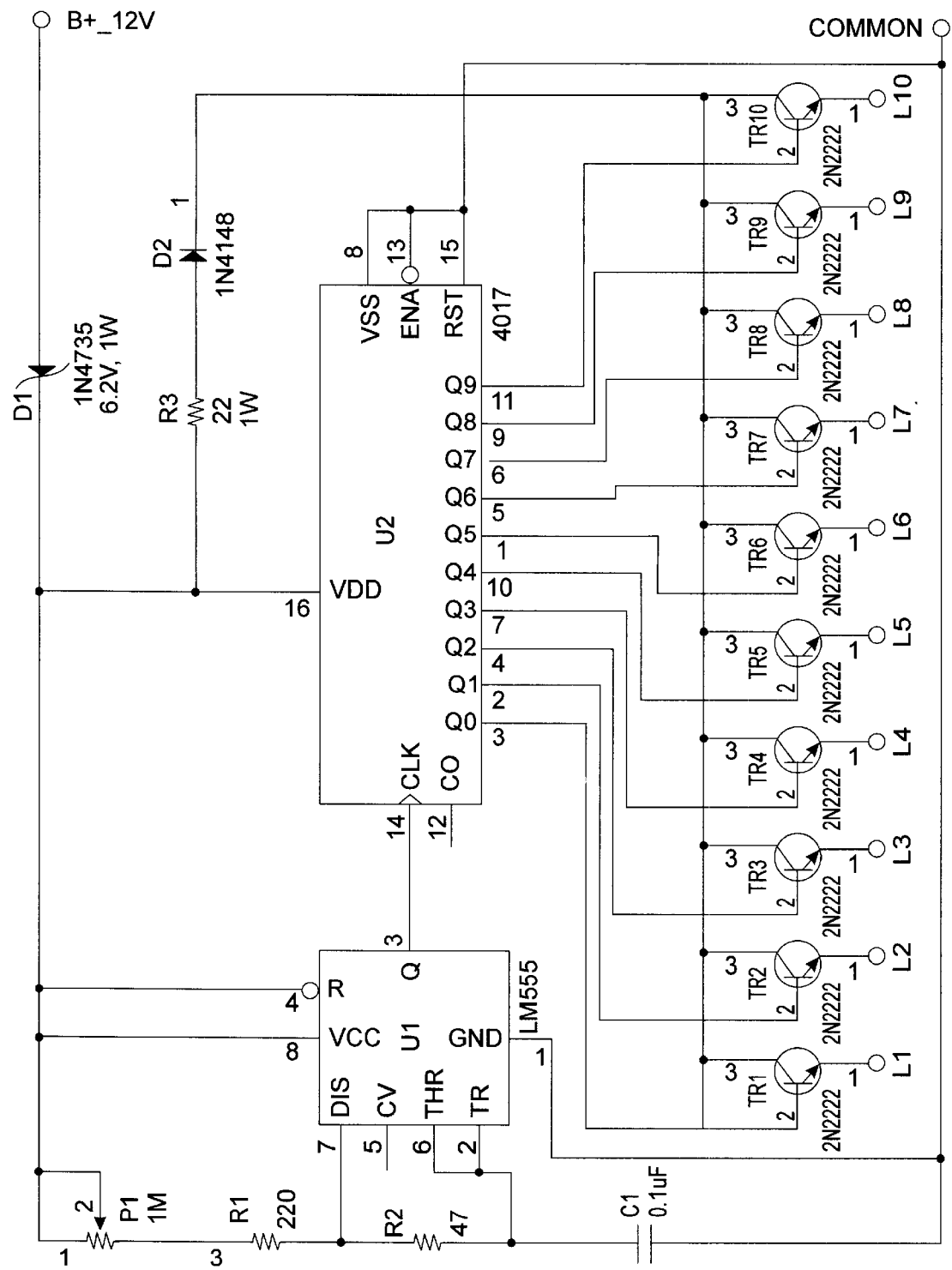
FIG. 1 is an electrical schematic diagram of the preferred embodiment of the invention.
Figure 2:
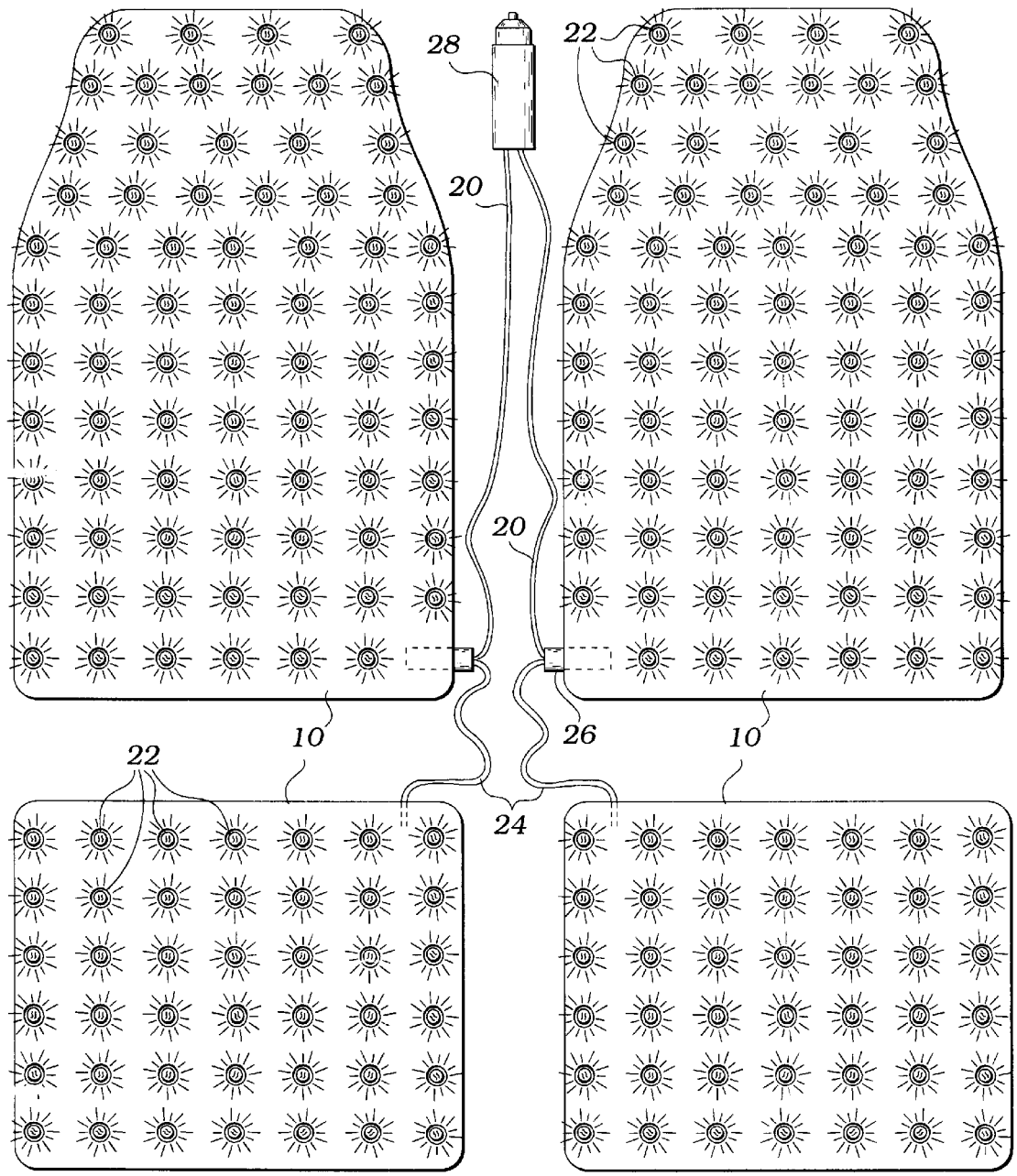
FIG. 2 is a plan view thereof.
Figure 3:
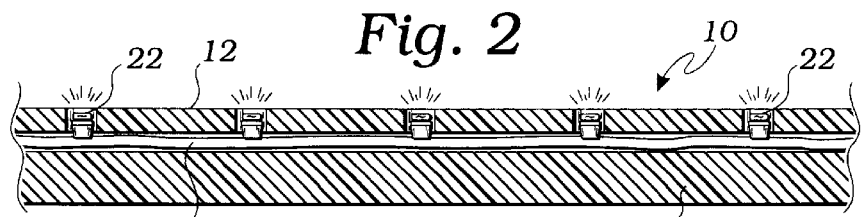
FIG. 3 is a sectional view thereof taken along line 3—3 in FIG. 2.

The above described drawing figures illustrate the invention, a lighted floor mat for a vehicle.

The preferred embodiment of the invention comprises at least one, but preferably a plurality of floor mats 10, preferably two or four such mats, each made of a flexible and durable material such as rubber as is well known, and of a size and shape for covering a selected area of floor of a vehicle such as in front of each of the chairs within the vehicle as is also well known. A lamp electrical circuit 20 comprises a plurality of lamps 22 wired in spaced apart positions within the fabric of each of the floor mats 10 and positioned to be seen from above the floor mats when the floor mats are installed for use on the floor of a vehicle (not shown). A means for providing electrical current 28 to the electrical circuit 20 for illumination of the lamps 22 is preferably a cigarette lighter plug capable of being inserted into a cigarette lighter of the vehicle for providing 12 volt DC current to the floor mat electrical circuit 20. Preferably, the lamps 22 are solid-state light emitting diodes which draw very little current and provide enough light to see within the vehicle at night or in a dark garage. The electrical circuit 20 is preferably embedded between a top compliant layer 12 of the floor mats 10 and a bottom structural layer 14 of the floor mats so that the LED lamps 22 and their interconnecting wiring 24 is not damaged when stepping on the floor mats 10.

Preferably, the electrical circuit 20 further comprises at least one timing device 26 interconnected with the plurality of lamps 22 so as to sequence the lamps in accordance with a sequencing program. Such a timing device 26 is well known in the art as various types are used for Christmas lighting and theater marquee lighting. The sequencing of the lamps 22 may be set so as to alternately illuminate and extinguish the plurality of lamps 22 at a selected rate, illuminate each of the plurality of lamps 22 in sequence at a selected rate, illuminate groups of the plurality of lamps 22 in sequence at a selected rate, or many other decorative effects.

FIG. 1 is a schematic diagram of the preferred electrical circuit 20 of the invention. U1 is an integrated circuit LM555, and U2 is a 4017 device, both well known in the art. Each of the 2N2222 transistors drives an LED, L1–10 and each is lit in accordance control voltage VDD. U1 provides a clock signal for timing with P1 and C1 establishing an RC time constant. The circuit may be modified slightly for providing different lighting sequences for various decorative effect.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising in combination: an automotive vehicle having a floor for receiving floor mats; one of a plurality of spaced a part a pair and two pair of said spaced apart floor mats covering selected areas of the floor of the vehicle; each of the floor mats made of only two layers of material, a top compliant layer and a bottom structural layer; each of the floor mats further providing a lamp electrical circuit comprising a plurality of lamps wires positioned between the top and the bottom layers; and a cigarette lighter plug interconnected through interconnecting wiring separately with each of the lamp electrical circuits through a timing device.

2. The apparatus of claim 1 wherein the timing devices provide sequencing programs for illuminating the lamps of each of the floor mats at one of a selected rate, in sequence and a selected rate in sequence as groups.

* * * * *